United States Patent [19]

Marsden, Jr. et al.

[11] Patent Number: 5,221,827
[45] Date of Patent: Jun. 22, 1993

[54] HEATER BLANKET FOR IN-SITU SOIL HEATING

[75] Inventors: Arnold R. Marsden, Jr.; Arthur L. Otermat, both of Houston, Tex.; David A. Weingaertner, Framingham, Mass.; Paul C. Johnson, Sugar Land, Tex.; Lynton W. R. Dicks, Houston, Tex.; Harvey B. Wilde, Houston, Tex.

[73] Assignee: Shell Oil Company, Houston, Tex.

[21] Appl. No.: 834,081

[22] Filed: Feb. 12, 1992

[51] Int. Cl.⁵ ............................................. H05B 3/34
[52] U.S. Cl. .................................. 219/200; 219/213; 219/535
[58] Field of Search ............... 219/200, 201, 213, 528, 219/535, 552, 553

[56] References Cited

U.S. PATENT DOCUMENTS

| | | | |
|---|---|---|---|
| 1,855,092 | 4/1932 | Browne | 219/535 |
| 3,207,887 | 9/1965 | Drugmand | 219/535 |
| 3,676,641 | 7/1972 | Olson | 219/200 |
| 3,749,881 | 7/1973 | Tanaka | 219/535 |
| 4,613,744 | 9/1986 | Fraser | 219/200 |

FOREIGN PATENT DOCUMENTS

| | | | |
|---|---|---|---|
| 2031187 | 12/1971 | Fed. Rep. of Germany | 219/200 |
| 731208 | 6/1955 | United Kingdom | 219/552 |
| 762576 | 11/1956 | United Kingdom | 219/201 |
| 893125 | 4/1962 | United Kingdom | 219/535 |

*Primary Examiner*—Teresa J. Walberg

[57] ABSTRACT

A soil heater assembly (SHA) utilizes for example, two or more, 5 ft by 10 ft heating sections rigidly bolted together. Each section contains three NICHROME heating elements encased in ceramic beads which are floatingly pinned to a 4-inch thick ceramic fiber insulation encased in NEXTEL cloth. The heating elements run across the entire length and width of the SHA, spaced approximately three inches apart. The heating sections are pinned to their respective 5 ft by 10 ft stainless steel support frame, which is made out of structural angles and flat bars, with pins running through the four-inch ceramic fiber insulation. Since the insulation is somewhat compressible and the pins are slideable therethrough, i.e. not fixed, the heater elements can move or "float" vertically to accommodate surface irregularities of the soil. Both heating sections and support frames are then positioned side-by-side on the ground, bolted together, and covered by another four inches of fiber insulation. All of the insulation packages are surrounded by NEXTEL or a silica-based cloth for ease of handling and retaining their integrity. The entire assembly may be lifted by a crane and moved to another site, or it may be fitted with wheels and towed.

20 Claims, 4 Drawing Sheets

HEATER BLANKET FOR IN-SITU SOIL HEATING

BACKGROUND OF THE INVENTION

1. Field of the Invention

The invention relates to an improved design for a heater blanket for use in in-situ decontamination of soil.

2. Description of the Prior Art

Assignee's U.S. Pat. No. 4,984,594 to Vinegar et al discloses an in-situ apparatus and method for remediation and decontamination of surface and near-surface soils by evacuating the soil under a flexible sheet, which is impermeable to gases, and heating the soil surface with a relatively flat electric surface heater, which is permeable to gases. This patent discloses that the surface heater may be a mesh constructed from a conducting metal, such as stainless steel or resistance wire sold under the trademark NICHROME, which can tolerate temperatures as high as 1000° C. or more. The mesh has a total effective resistance of several ohms and good mechanical strength for durability when dragged over rough terrain. A 325 mesh of 304 stainless steel with wire 0.0014-inch in diameter is preferred. This patent discloses that the surface heater may also be constructed of metal wires which loop back and forth but do not form a mesh. For example, the metal wires could be stitched into a ceramic fiber cloth such as wire-reinforced NEXTEL 440 a trademark of Minnesota Mining & Manufacturing Co. of St. Paul, Minn. The surface heater could also consist of metal strips or ribbons or a metallic coating in a defined pattern. Still another possibility is to construct the surface heater from a thin metal foil or sheet with perforations to allow gas flow through the foil or sheet.

A preferred configuration for a permeable mat with good thermal insulation propeties, according to the patent, is a layer of NEXTEL ceramic fiber combined with a layer of corrugated 304 stainless steel knitted wire mesh with about ¼-inch crimp. The knitted wire mesh has extremely high gas permeability and can easily support a force of 15 pounds per square inch. Moreover, the thermal conductivity of such a knitted wire mesh is low. The permeable mat may be composed of multiple layers, including insulating layers, to reduce convection and radiation. Thus, the permeable mat may comprise a a layer of NEXTEL ceramic fiber, then a layer of corrugated knitted wire mesh, then a layer of perforated aluminum foil for a radiation reflecting shield, then another layer of NEXTEL, another layer of knitted wire mesh, another aluminum foil shield, etc.

In Assignee's co-pending U.S. patent application Ser. No. 800,192 filed Nov. 27, 1991, an improved heater blanket for use in soil remediation utilizes a rigid construction which isolates the heater elements from air, water, and contaminant vapors which could act to oxidize, embrittle or otherwise degrade the integrity of the electrical heaters. A rigid structural frame comprises a support frame of parallel members which are rigidly connected to a series of support tubes perpendicular thereto. The support tubes enclose and protect the heater elements. One or more heater modules thus constructed may be easily transported to a selected site. A heater element, preferably stranded wire, is placed inside an electrically insulating sleeve, preferably NEXTEL. The sleeve and the wire are placed inside a support tube, preferably made of stainless steel. An array of tubes is rigidly connected to rigid frame members for ease of assembly/transportation. The spacing between the tubes may be 1-6 inches with bus bars connecting the wires from each individual tube to a source of electrical power.

SUMMARY OF THE INVENTION

Assignee's soil heater assembly (SHA) comprises, e.g. two, 5 ft by 10 ft heating sections bolted together in a 10 ft × 10 ft assembly. The following description is used for purposes of illustration only and an assembly could be, for example, a one-piece construction approximately 50 feet square. Each 5 ft by 10 ft section contains three NICHROME resistance wire heating elements encased in ceramic beads which are floatingly pinned to a 4-inch thick ceramic fiber insulation encased in NEXTEL cloth. The heating elements run across the entire length and width of the SHA and are spaced approximately three inches apart. The heating sections are then pinned to their respective 5 ft by 10 ft stainless steel support frames, which are made out of structural angles and flat bars, with double-headed pins running through the four-inch ceramic fiber insulation and support frame. Since the insulation is somewhat compressible and the pins not fixed on either end, i.e. they are slideable, the heater elements can move or "float" vertically to accommodate surface irregularities of the soil. Both heating section support frames are then positioned side-by-side on the ground, bolted together, and covered by another four inches of fiber insulation. All of the insulation packages are enclosed by NEXTEL or silica-based cloth for ease of handling and retaining their integrity. The entire assembly is rigidly connected to a main support frame having lifting attachments which permit relatively easy movement from one site to another.

DETAILED DESCRIPTION OF THE INVENTION

The instant invention was developed for potential remediation of shallow, organic-contaminated soils. It may also be applied to sites where shallow soils i.e. 0-3 feet in depth, are contaminated by volatile, semivolatile, and nonvolatile and recalcitrant chemicals (e.g., PCB's, pesticides, PNA, crude oil, diesel fuel, etc.).

Assignee's in-situ soil heating process requires that a heater capable of producing up to 500 W/ft$^2$ at temperatures up to 1000° C. operate in a hostile environment for long periods of time.

The Enhanced Surface Soil Vacuum Extraction Process (ESSVEP) was designed primarily to remove relatively nonvolatile organic contaminants from surface soils (0-3 ft). As noted above, it is useful for other purposes. It consists of a power source, a soil heater assembly and a vapor treatment system. Heat is delivered to the soil and a vacuum applied to the treatment area removes the contaminants that are volatilized. The soil heater assembly comprises the heater and the vapor collection system. The heat supplied by the heater increases the concentration of the contaminants in the soil gases which are then extracted from the soil by the vapor collection system.

Figure 4A:
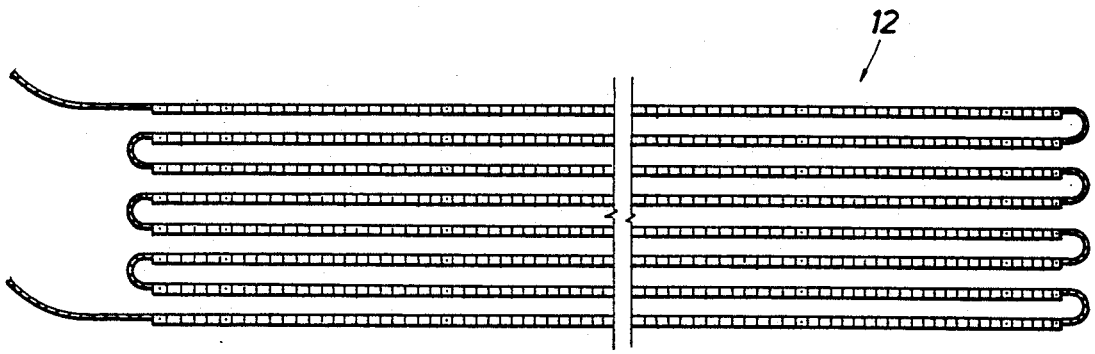
FIGS. 4A, 4B and 4C show details of the heater element assembly.
Figure 4B:
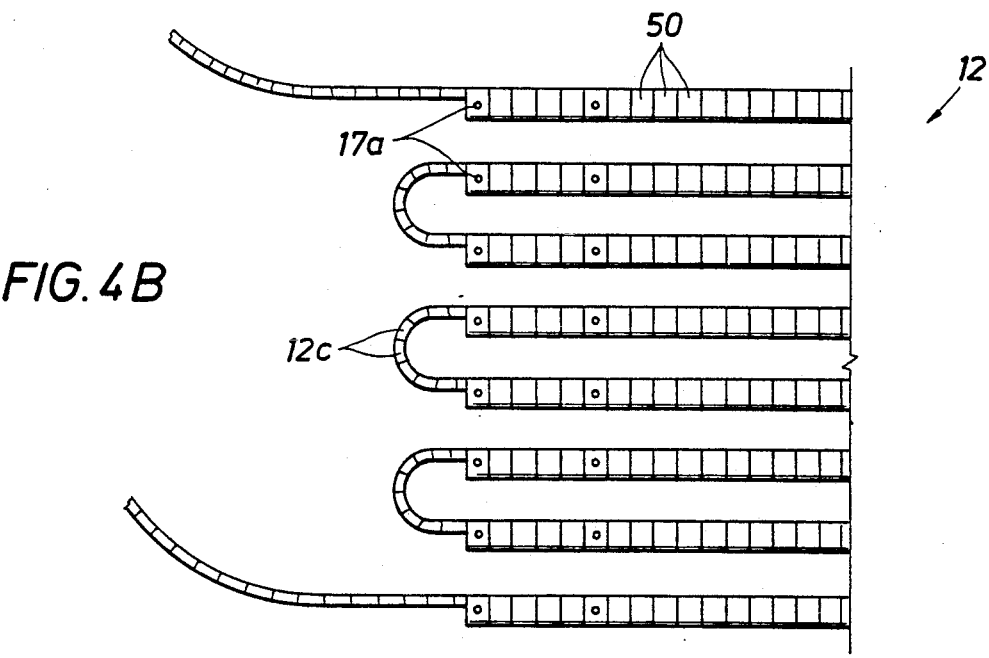
Figure 4C:
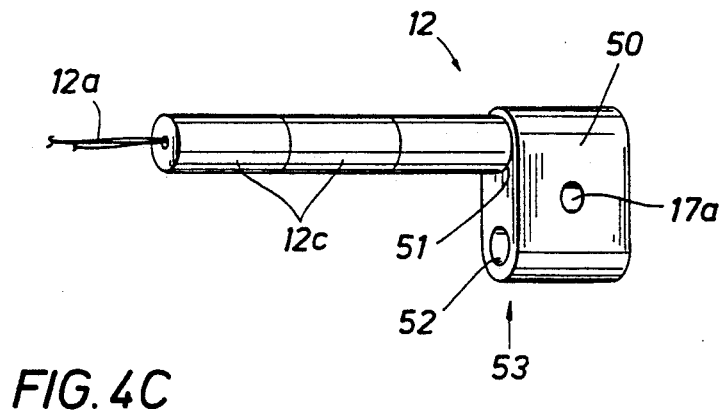

The various components of the heater assembly are shown in FIG. 4. The heaters themselves are stranded NICHROME resistance wires threaded through a hole running longitudinally through rectangular, high temperature-resistant ceramic beads (e.g., similar to those used in heat treating applications by Cooperheat). The beaded heaters run the entire length of the heater assembly and, since they use stranded NICHROME resistance wire, are very flexible. The ceramic beads also include a second hole running parallel to the first in which a non-heated support wire may be placed. Selected ones of the beads also contain a hole in the middle, and orthogonal to the aforementioned heater holes, for connection of the heater to an insulating cover and to the support frame by means of pins running therethrough. The support frame consists of welded stainless steel angles and flat bars. The heaters are connected to the flat bars of the support frame with stainless steel or NICHROME Alloy pins which pass through several inches (e.g., 4") of compressible ceramic fiber insulation. Since the pins are "double-headed" and not fastened at either end (i.e., they are free to slide), the heater is allowed to "float" and will conform to minor surface irregularities by differentially compressing the insulation against the support frame. Several more inches of insulation, preferably ceramic fiber, rest on top of the frame. Resting on the additional insulation is a canopy which is impermeable to vapor flow. It consists of a flat, stainless steel sheet cover with a skirt of silicone rubber sealingly attached to the edges to form an impermeable vapor seal with the ground. The stainless steel sheet cover is rigidized by a support frame rigidly attached thereto such as by welding. All elements beneath the canopy and skirt are permeable to vapor flow. A side view of the components of the soil heater assembly is shown in FIGS. 5A and 5B.

The canopy on top of the heater assembly contains fittings through which power and instrument connections can be made and through which the vapor collection pipe can be placed (either at or below ground-level). A wire of much lower resistance exists between the heater wires and the power connections on the canopy (e.g., larger cross section of NICHROME resistance wire, nickel wire, etc.) to reduce the temperature at this connection.

The components of the soil heater assembly may all be fastened into one piece for easy movement. A plurality of lifting points rigidly connected to a frame attached to the canopy are included for this purpose. The entire assembly may then be lifted by a crane or may be fitted with wheels and simply towed to a new location.

The vapors from this system are collected and treated using a vacuum pump and standard pollution control equipment (e.g., scrubbers, incinerators, carbon adsorbers, etc.).

Figures 1, 2B:
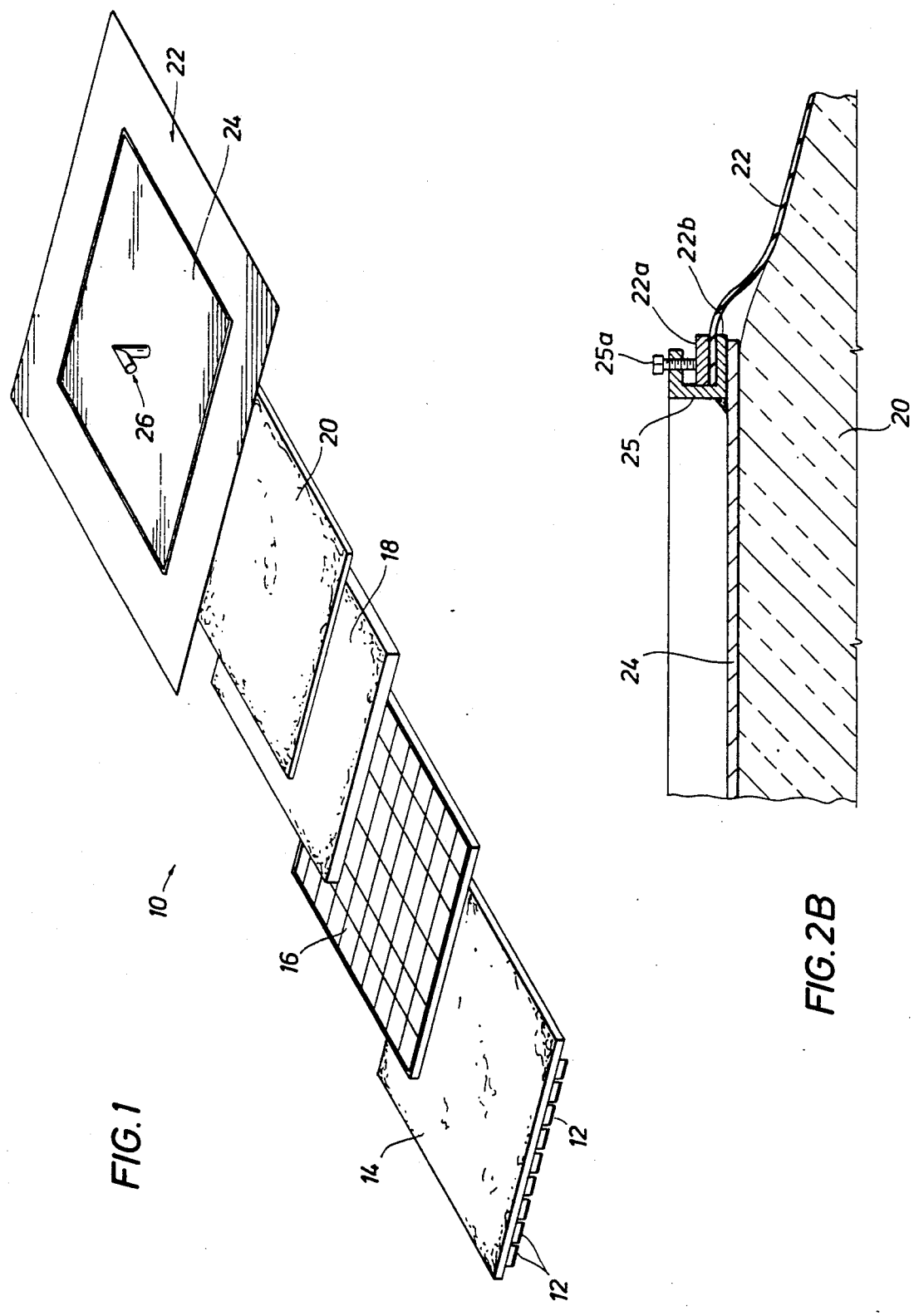
FIG. 1 shows a general layout of the present invention.
FIGS. 2A and 2B show a cross-sectional view of the soil heater assembly.

Referring now to FIG. 1, the heater assembly is shown generally at 10. The heaters 12, which rest on the contaminated soil when in place, lie beneath (and are attached to, as will be described) a layer of insulation 14, ceramic fiber, for example. Resting on top of the insulation 14 is a support frame 16, preferably made of stainless steel, which comprises a grid network of angle steel and steel plates to form a rigid frame. Resting on top of the support frame 16 are two more layers of insulation 18, 20, preferably ceramic fiber. Finally, a steel canopy 24 rests on top of the entire assembly and, in cooperation with a silicone butyl rubber skirt 22, forms a vapor seal over the contaminated soil.

Figure 2A:
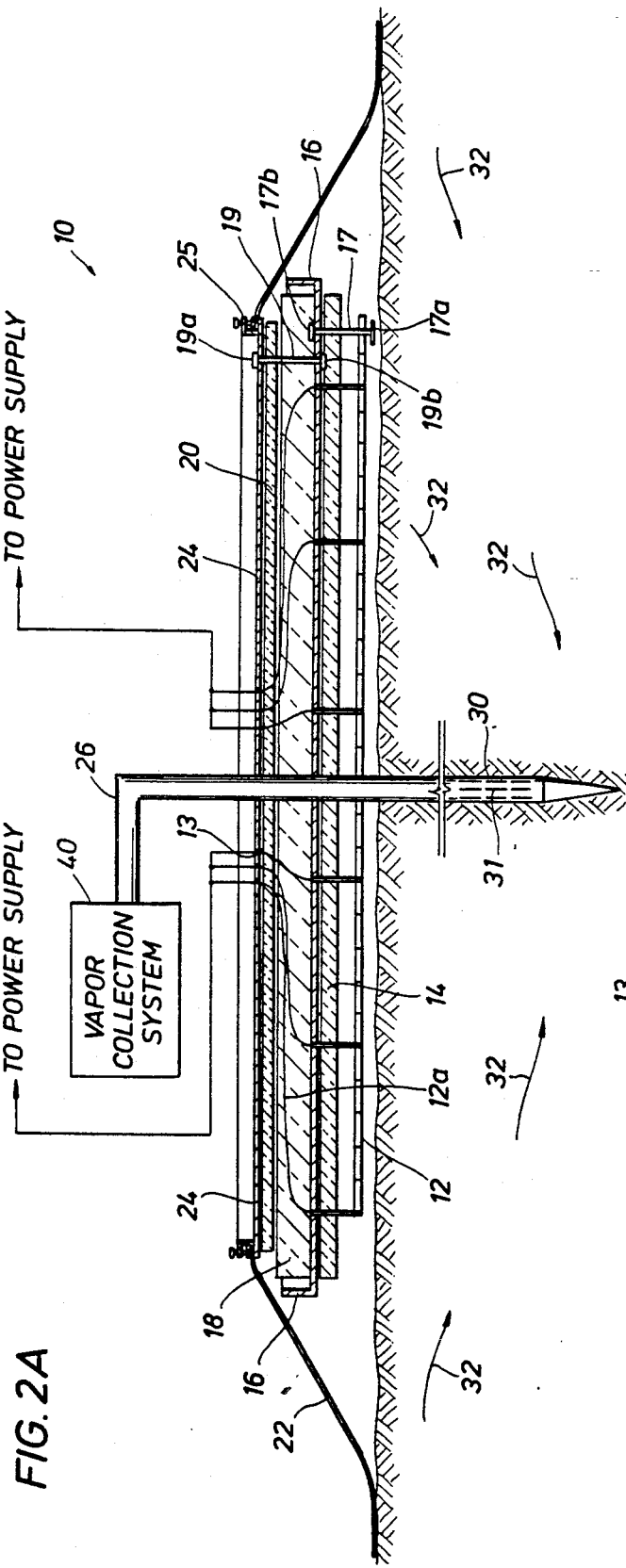

As shown in FIGS. 2A and 2B, the skirt 22 is sealingly attached to the canopy 24. A canopy frame 25 is welded to the canopy 24, the perimeter of the frame 25 comprising channel steel members having one leg 22b sealingly welded to the canopy 24. A plurality of bolts 25a are threaded through the frame member 25 and sealingly clamps the skirt 22 between a plate 22a and channel leg 22b as more clearly shown in FIG. 2B. The canopy 24 is fitted with a vacuum port 26 for connection to a vapor collection system comprising, e.g. a vacuum pump and treatment system 40 as shown in FIG. 5A. The vacuum port 26 is fitted with a pipe which extends to the soil surface. In a preferred embodiment, the vacuum port 26 is terminated with a hollow spike 30 which extends into the contaminated soil as will be subsequently described. The canopy 24 also provides electrical feed-throughs 13 for connecting the heater leads 12a to a power supply as shown in more detail in FIG. 3C. The heater leads 12a from the heaters 12 are preferably fed through the insulation layers 14, 18 and 20 and are then connected to the electrical feed-throughs 13 as shown in FIG. 3C. FIG. 2A shows a schematic cross-section of the soil heater assembly 10.

Figure 3A:
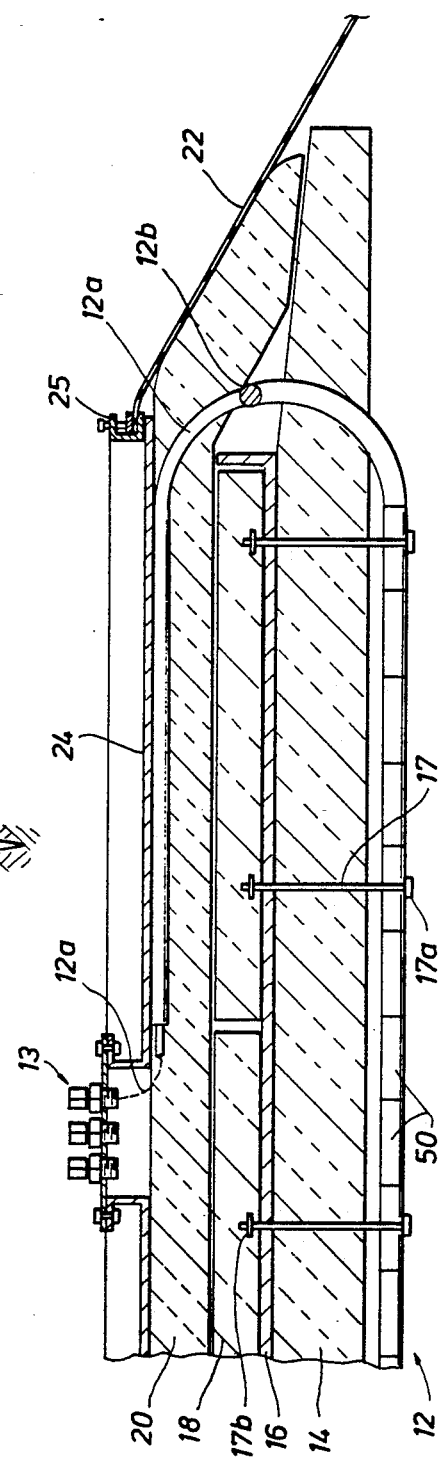
FIGS. 3A, 3B, and 3C show cross-sectional details of the heater of FIG. 2A.
Figure 3C:
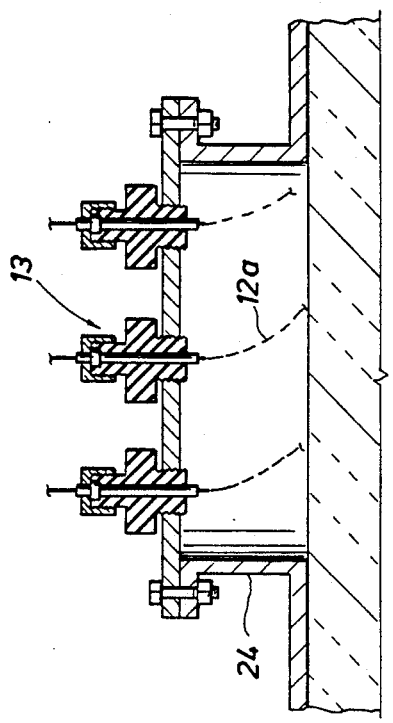
Figure 3B:
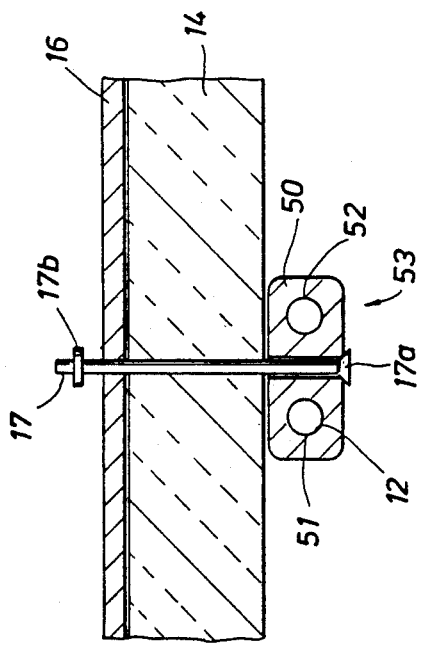

As shown in more detail in FIG. 3B, the heaters 12 and insulation 14 are held in place preferably by means of a plurality of stainless steel or NICHROME Alloy pins 17 having heads 17a and 17b which allow relative motion between the heaters 12 and the frame 16, i.e. the pins 17 are slideable rather than being fixed to the heaters 12 or frame 16. This allows the heaters 12 to "float" and generally follow the contour of the contaminated soil surface. The head 17b of pin 17 may be a quick-disconnect washer which will allow easy removal and replacement of any individual heater 12. Additionally, as best shown in FIG. 2A, the steel canopy 24 and support frame 16 are similarly floatingly connected, preferably by a plurality of stainless steel or NICHROME alloy pins 19 having heads 19a and 19b. Head 19a, however, does not "float" but is fixedly attached to the canopy 24 and its frame 25 such as by welding thereto. Head 19b, however is not fixedly attached to the support frame 16 thereby allowing the frame 16 to float up and down on pin 19. The head 19a also must maintain the integrity, i.e. impermeability, of the vapor seal.

In an alternative embodiment, FIG. 2A also shows the vacuum port 26 extending into a hollow spike 30 which penetrates the earth to a depth of up to about 3 feet depending upon the contaminant. The bottom portion of the spike 30 is perforated at its lower end at 31 for a distance of about 6–8 inches. This configuration forces vapor flow to follow the path shown by arrows 32 downward through the soil, toward perforations 31 and into the vapor collection system 40 for treatment.

The primary insulation 14 is preferably ceramic fiber insulation encased in NEXTEL. The secondary 18 and upper 20 layers of insulation are preferably encased in NEXTEL or a silica-based cloth.

FIG. 3A shows further details of the soil heater assembly cross-section showing the primary 14, intermediate 18, and upper 20 insulation layers. The heater leads 12a may be brought out through the insulation 14 so as to lie between the insulation layers 18 and 20 (not shown). This results in exposing these terminations to much lower temperatures (than connections made nearer the soil surface) thereby decreasing embrittlement and mechanical failure because of grain boundary sulphidation. Preferably, as shown in FIG. 3A, the heaters 12 are brought out to a point 12b at which the heater 12 is welded to a larger cross-section, such as three NICHROME heater sections in parallel. This large cross-section becomes the heater lead 12a which is brought out on top of the upper insulation 20 and beneath the canopy 24. The usual connection to feedthrough 13 is then made as shown in FIG. 3C.

FIG. 4 shows details of the heater 12 configuration. The heater 12 itself is made up of standard multi-strand 80/20 NICHROME wires inserted into a plurality of rectangular ceramic insulators 50 having two holes 51, 52 drilled longitudinally therethrough. The heater 12 is threaded through one hole, say 51. A 'dummy' NICHROME wire 53, also made from the same NICHROME wire, is threaded through the second hole 52 to ensure that the heater assembly (wires plus insulators) will lie flat and parallel to the ground surface. It is standard practice with heater design and usage that the power connections are made to the heater via a low resistance bus or lead section. This can be accomplished in several ways. The most common techniques typically use a low resistance section with a length of nickel wire or a marked increase in cross-section of the heater material itself. A NICHROME-to-low-resistance-nickel lead wire junction with the heater may be made so that the weld junction 12b is located between insulation layers 18 and 20 where the average temperature is approximately 900° F. Preferably, to maintain the nickel lead wire at an even lower temperature so that embrittlement due to grain growth would be low, the length of NICHROME heater wire 12a may be extended to permit the NICHROME-to-nickel weld and nickel wire leads to be located in an area where the average temperatures would be much lower i.e., located at the point where the wires emerge from the uppermost insulation 20 and pass beneath the flat metal canopy 24 before being connected to the power lead-through devices 13. Preferably, the heater 12 terminates with a weld joint 12b to a higher cross-section (therefore, lower resistance) such as three lengths of NICHROME wire in parallel. Cylindrical ceramic insulators 12c are used to connect lengths of heater sections where they loop back and forth and to bring out the heaters to heater leads 12a. This provides further flexibility.

Figure 5:
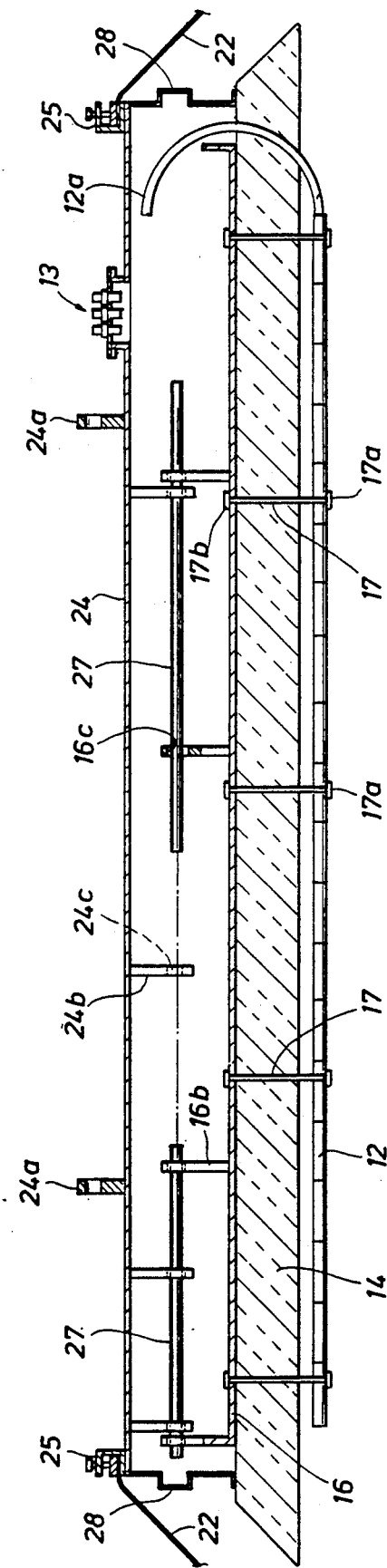
FIG. 5 shows details of mechanical interconnection.

Referring now to FIG. 5, in a preferred embodiment, the entire assembly is fixedly connected to, and covered by, a canopy 24 having a frame member 25. The frame member 25 includes rigid lifting points 24a thereon which may be used for lifting the entire assembly, as by a crane, and moving it to another site. Alternatively, the entire assembly may simply be fitted with wheels and towed to another site. This greatly facilitates movement and, additionally, will conserve the heat already built up in the assembly, i.e., it can be moved while hot. The canopy 24 and canopy frame 25 are secured to the support 16 by means of a plurality of cooperating support lugs 16b and 24b. Each of the lugs has holes 16c and 24c, respectively therethrough for lockingly receiving a connecting rod 27 which is threaded through the holes by means of access holes 28 in the sidewalls of the canopy 24. The holes 16c and 24c have wide tolerances to permit easy insertion of the rods 27. When the rods 27 are in place, the access holes 28 are sealingly covered, thereby maintaining the integrity of the vapor seal formed by the canopy 24, insulation layer 14 and skirt 22. For treatment of large areas, skirts 22, and insulation layers 18, 20 may be dispensed with.

What is claimed is:

1. A heater blanket for use in in-situ treatment of contaminated soil comprising:
    a plurality of flexible electric heaters;
    an insulating blanket covering said plurality of heaters;
    a rigid support frame resting on said blanket;
    a plurality of pins slidingly inserted through said heaters, said blanket and said support frame, said pins being terminated at each end, when in place, by a head which prevents removal of said pin while said heads remain in place;
    an impermeable canopy over said support frame, the sides of said canopy resting on said blanket when in place;
    a plurality of attachment lugs rigidly connected to said support frame and said canopy, respectively, said lugs having holes therein, selected ones of said support frame and said canopy lug holes being in alignment when said canopy is in place;
    a connecting rod inserted through selected ones of said aligned holes, said rods being inserted through a plurality of access holes in the side of said canopy;
    a second and third layer of insulation located between said support frame and said canopy;
    a skirt sealingly attached to the periphery of said canopy, said canopy and said skirt, when in place, covering said contaminated soil;
    a vapor collection port extending through said canopy to said contaminated soil;
    a vapor collection system connected to said vapor collection port at the surface of said contaminated soil;
    heater heads connected to said heaters, said heater leads extending along the top of said insulation;
    electrical feeds-throughs in said canopy for connecting said heater leads through said canopy;
    rigid attachment points located on said canopy for lifting said heater blanket for placement thereof; and
    power supply means for supplying electric power to said feed-through terminals.

2. The apparatus of claim 1 wherein said heaters are enclosed by a plurality of ceramic beads.

3. The apparatus of claim 2 wherein said ceramic beads are rectangular in shape and include two parallel holes running longitudinally therethrough.

4. The apparatus of claim 3 wherein a heater wire is threaded through one of said parallel holes.

5. The apparatus of claim 4 wherein a dummy heater wire is threaded through said second parallel hole.

6. The apparatus of claim 1 wherein said vapor collection port terminates in a hollow cylindrical spike which extends into said contaminated soil.

7. The apparatus of claim 6 wherein said spike is perforated at its lower end.

8. The apparatus of claim 1 wherein one of said heads is a quick-disconnect washer.

9. A heater blanket for use in in-situ treatment of contaminated soil comprising:
    a plurality of flexible electric heaters;
    a first blanket covering said plurality of heaters;
    a rigid support frame resting on said blanket;
    a second insulating blanket covering said support frame;

an impermeable canopy over said second blanket, said canopy resting on said second insulating blanket when in place;

first pin means penetrating said heaters, said first insulating blanket and said support frame, said pin means having double heads for maintaining relative position between said pinned elements but permitting movement of said elements vertically along said first pin means;

second pin means penetrating said support frame, said second blanket and said canopy, said second pin means having one end fixedly and sealingly attached to said canopy, said other end having a head permitting vertical movement of said support frame along said second pin means;

a skirt sealingly attached to the periphery of said canopy, said canopy and said skirt, when in place, covering said contaminated soil and forming an impermeable seal;

a vapor collection port extending through said canopy to said contaminated soil;

heater leads connected to said heaters, said heater leads extending along the top of said second insulating blanket and beneath said canopy;

electrical feeds-throughs in said canopy for connecting said heater leads through said canopy; and power supply means for supplying electric power to said feed through terminals.

10. The apparatus of claim 8 further including a canopy support frame rigidly and sealingly attached to said canopy.

11. The apparatus of claim 9 further including lifting attachment points rigidly connected to said canopy support frame.

12. The apparatus of claim 9 wherein said heaters are enclosed by a plurality of ceramic beads.

13. The apparatus of claim 12 wherein said ceramic beads are rectangular in shape and include two parallel holes running longitudinally therethrough.

14. The apparatus of claim 13 wherein a heater wire is threaded through one of said parallel holes.

15. The apparatus of claim 14 wherein a dummy heater wire is threaded through said second parallel hole.

16. The apparatus of claim 9 wherein said vapor collection port terminates in a hollow cylindrical spike which extends into said contaminated soil.

17. The apparatus of claim 16 wherein said spike is perforated at its lower end.

18. The apparatus of claim 9 wherein one of said heads is a quick-disconnect washer.

19. A heater blanket for use in in-situ treatment of contaminated soil comprising:
a plurality of flexible electric heaters;
an insulating blanket covering said plurality of heaters;
a rigid support frame resting on said blanket;
a plurality of pins slidingly inserted through said heaters, said blanket and said support frame, said pins being terminated at each end, when in place, by a head which prevents removal of said pins while said heads remain in place;
an impermeable canopy over said support frame, the sides of said canopy resting on said blanket when in place;
a plurality of attachment lugs rigidly connected to said support frame and said canopy, respectively, said lugs having holes therein, selected ones of said support frame and said canopy lug holes being in alignment when said canopy is in place;
a connecting rod inserted through selected ones of said aligned holes, said rods being inserted through a plurality of access holes in the side of said canopy;
a vapor collection port extending through said canopy to said contaminated soil;
heater leads connected to said heaters, said heater leads extending along the top of said support frame beneath said canopy; and
electrical feed-throughs in said canopy for connecting said heater leads through said canopy.

20. The apparatus of claim 19 wherein one of said heads on said pins is a quick disconnect washer.

* * * * *